United States Patent Office 3,495,930
Patented Feb. 17, 1970

3,495,930
CHEMICALLY CATALYZED POLYMERIZATION OF UNSATURATED MONOMERS CONTAINING BOTH ELECTROPHILIC AND NUCLEOPHILIC GROUPS ON KERATIN FIBERS
Greville Machell, Spartanburg, S.C., assignor to Deering Milliken Research Corporation, Spartanburg, S.C., a corporation of Delaware
No Drawing. Filed Dec. 6, 1962, Ser. No. 242,613
Int. Cl. D06m $13/16$, $13/20$
U.S. Cl. 8—127.6      12 Claims

ABSTRACT OF THE DISCLOSURE

Modification of textile fibers by polymerizing thereon (1) an unsaturated monomer having acidic groups and an unsaturated monomer having electrophilic groups, (2) an unsaturated monomeric partial ester obtained from the reaction of an amino alcohol and an unsaturated polybasic acid, or (3) an unsaturated monomeric compound containing both quaternary ammonium and acidic groups.

---

This invention relates to a method for modifying the characteristics of fibrous substrates and, more particularly, to a method for increasing the moisture regain of a fibrous substrate, particularly keratin fibers.

Keratin fibers, particularly wool, have been treated with various monomeric compounds containing $$CH_2=C-$$
$$|$$

grouping to minimize the tendency of the wool fibers to shrink upon subsequent wetting. The products of the treatments utilized to date, however, have been characterized by a reduced affinity for water vapor or, in other words, a reduced moisture regain level. Products of these previous efforts have also been characterized by an inferior hand, i.e., the fabrics treated felt harsher to the touch. A partial explanation for the inferior hand is the large amount of homopolymer formed during the treatments of the prior art, i.e., a large amount of the polymer formed during the treatments of the prior art is not chemically attached, or grafted to the wool fibers. It is now believed that the reduced moisture regain of these fibers also contributes to the inferior hand.

In addition, when fibers are treated with prior art processes, resulting in reduced moisture regain, and these fibers are combined with a synthetic fiber such as Dacron (trademark for polyethylene terephthalate fibers), fabrics prepared from such a mixture are characterized by an increased static electricity problem in that the ability of the total fabric to absorb moisture, which would minimize the static electricity problem, has been reduced.

It is an object of this invention to react textile fibers with certain compounds which will modify many of the characteristics of said fibers, particularly the moisture regain.

A further object of this invention is to provide keratin fibers having an increased moisture regain while minimizing the diminution of fiber properties as occurs using prior art techniques.

Another object of this invention is to provide such fibers in a blend with synthetic fibers, the blend being characterized by a reduced ability to develop and maintain static electricity.

These objects are accomplished, and the difficulties inherent in the utilization of prior art processes are obviated, in accordance with this invention by reacting textile fibers with various monomers, or low polymers thereof, containing a $$CH_2=C-$$
$$|$$

grouping in such a manner that the monomers are reacted with themselves and with the fibers, either through covalent or ionic bonds. For permanence, the reacted monomers are preferably attached to the fibers through covalent bonds.

Suitable compounds for use in accordance with this invention which contain the above grouping, which can be either vinyl or vinylidene, include the following:
(1) A combination of certain acidic and basic materials,
(2) Certain partial esters containing both an acid and a basic grouping, and
(3) Certain quaternary compounds.

COMBINATION OF MONOMERS

In this embodiment of the invention the properties of textile fibers, most particularly the moisture regain, are improved by reacting the fibers with at least two compounds containing the $$CH_2=C-$$
$$|$$

grouping, one of which preferably comprises an acid, the other a base.

ACIDS

Suitable acids for use in accordance with this invention include the ethylenically unsaturated acids of the formulae:

I
$$CH_2=C-COOX$$
$$|$$
$$R^1$$

wherein the radical $R^1$ is hydrogen, lower alkyl of 1 to 4 carbon atoms (preferably methyl or ethyl), $$—CH_2COOX$$

or $—SO_3X$; at least one X in said acid being hydrogen, the remaining X, if any, being selected from hydrogen, lower alkyl of 1 to 4 carbon atoms, or an alkali-metal ion (including sodium, potassium and lithium);

II
$$\begin{array}{c} R^2 \\ | \\ XOOC—C=C—COOX \\ | \\ R^3 \end{array}$$

wherein $R^2$ and $R^3$ are selected from hydrogen, lower alkyl of 1 to 4 carbon atoms (preferably methyl or ethyl) and $—SO_3X$, at least one X in said acid being hydrogen, the remaining X, if any, being selected from hydrogen, lower alkyl of 1 to 4 carbon atoms or an alkali-metal ion (including sodium, potassium and lithium).

III
$$\begin{array}{c} R^4 \\ | \\ XOOCCH_2—C=C—COOX \\ | \\ R^5 \end{array}$$

wherein no more than one of the radicals $R^4$ and $R^5$ is $—COOX$, the remaining radical (or radicals where neither $R^4$ nor $R^5$ is $—COOX$), being hydrogen, lower alkyl of 1 to 4 carbon atoms (preferably methyl or ethyl), at least one X in said acid being hydrogen, the remaining X being selected from hydrogen, lower alkyl of 1 to 4 carbon atoms or an alkali-metal ion (including sodium, potassium and lithium).

IV
$$CH_2=C\underset{Z}{\overset{Y_r\ (R^6)_m}{-}}\!\!\!\!\!\!\!\!\!\!\!\!\!\!\!\!\!\!\!\!\!\!\!\!\!-(CH_2)_p—SO_3X'$$

(aromatic organic sulfonic acid compounds)

V    $CH_2=CR^7-(CH_2)_m-SO_3X'$
(alkenyl organic sulfonic acid compounds)

VI   $CH_2=C-COO-(CH_2)_n-SO_3X'$
     $\phantom{CH_2=C}|$
     $\phantom{CH_2=C}Z$
(sulfoalkyl acrylate organic sulfonic acid compounds)

VII  $CH_2=C-CONH-(CH_2)_n-SO_3X'$
     $\phantom{CH_2=C}|$
     $\phantom{CH_2=C}Z$
(acryloyl taurine homologue compounds)

VIII $CH_2=C-CH_2NH-(CH_2)_n-SO_3X'$
     $\phantom{CH_2=C}|$
     $\phantom{CH_2=C}Z$
(allyl taurine homologue compounds)

wherein X' is selected from hydrogen or an alkali-metal ion; Y is hydrogen, chlorine or bromine; $R^6$ is methyl or ethyl; $R^7$ is hydrogen, ethyl, methyl, or carboxyl; Z is hydrogen or methyl; m has a numerical value in whole number increments from 0 to 2; n has a numerical value of 1 or 2; p is 0 or 1; and r is 1 to 4.

Preferred acidic compounds within the scope of Formula I include acrylic, methacrylic, itaconic, and sulfoacrylic acids. Maleic, fumaric, citraconic, mesaconic, sulfomaleic and disulfomaleic acids constitute preferred acids within the scope of Formula II, while glutaconic and aconitic acids are preferred acids within the scope of Formula III.

Aromatic vinyl-containing sulfonic acid compounds (corresponding to Formula IV) include para-styrene sulfonic acid; ortho-styrene sulfonic acid; para-isopropenyl benzene sulfonic acid; para-vinyl benzyl sulfonic acid; ortho-isopropenyl benzyl sulfonic acid; sodium para-styrene sulfonate; potassium ortho-styrene sulfonate; ortho-vinyl benzene sulfonic acid; 2-chloro-4-vinyl benzene sulfonic acid; 4-bromo-2-isopropenyl benzene sulfonic acid; 3-vinyl toluene 6-sulfonic acid, sodium salt; 2-ethyl-4-vinyl benzene sulfonic acid; 2,3-dichloro-4-vinyl benzene sulfonic acid; 2,3,5-tribromo-4-vinyl benzene sulfonic acid; 2 - chloro - 3-vinyl-toluene-6-sulfonic acid; 2,3-diethyl-4-vinyl-benzyl sulfonate, sodium salt and the like.

Alkenyl sulfonic acids (corresponding to Formula V) include ethylene sulfonic acid; sodium ethylene sulfonate; potassium ethylene sulfonate; 1-propene 3-sulfonic acid; 1-propene 1-sulfonic acid, sodium salt; 1-propene 2-sulfonic acid; 1-butylene 4-sulfonic acid; 1-butylene 3-sulfonic acid and tertiary butylene sulfonic acid and the like.

Sulfoalkylacrylates (corresponding to Formula VI) include sulfomethyl acrylate, 2-sulfoethyl acrylate; sulfomethyl methacrylate, sodium salt; 2-sulfoethyl methacrylate; 2-sulfoethyl methacrylate, potassium salt and the like.

Acryloyl taurine and homologues (corresponding to Formula VII) include N-acryloyl taurine; N-acryloyl taurine, sodium salt; N-methacryloyl taurine, N-methacryloyl taurine, potassium salt; N-acryloyl-aminomethane sulfonic acid; N-methacryloyl-aminomethane sulfonic acid, sodium salt; and the like.

Allyl taurine and homologues (corresponding to Formula VIII), include allyl taurine; allyl taurine, sodium salt; allyl taurine, potassium salt; methallyl taurine; methallyl taurine, sodium salt; methallyl taurine, potassium salt; N-allyl-aminomethane sulfonic acid; sodium N-allyl-aminomethane sulfonate; lithium N - methallyl - aminomethane sulfonate.

Additional acidic compounds include such organic sulfonic acids as 2-propene sulfonic acid; α-sulfopropyl acrylate; sodium vinyl toluene sulfonate; potassium ortho-chlorostyrene sulfonate; 2-hydroxy-3-sulfopropyl acrylate, sodium salt; sodium 3 - allyloxyl - 2 - hydroxypropane sulfonate; 4-sulfophenyl acrylate, sodium salt, and N-allyl amino di-(2-ethane sulfonic acid).

BASIC COMPOUNDS

The basic compounds suitable for reaction with one or more of the above acids are full esters or ester salts having the formula corresponding to those of full esters or ester salts obtained by reacting with one of the above acids, an amino alcohol of the formula:

IX    $R^8$
      $|$
      $N-A-OH$
      $|$
      $R^9$ wherein $R^8$ and $R^9$ are selected from hydrogen, aryl, alkyl, aralkyl and alkaryl, the aryl radical preferably containing no more than one benzene ring, the alkyl group containing 1 to 8 carbon atoms, preferably 1 or 2; and wherein A is $(CR^{10}R^{11})_n$ wherein $R^{10}$ and $R^{11}$ are selected from hydrogen, methyl, or ethyl and n is 2 to 4; and wherein the total number of carbon atoms in said alcohol is no more than 12. If an ester formed from one of the above alcohols with one of the above acids still contains a radical designated as X, this X should be either lower alkyl of 1 to 4 carbon atoms or an alkali-metal ion, that is, X should not be hydrogen.

In this embodiment of the invention, the carboxyl and/or sulfonic groups of the acids are completely esterified or present in the form of a salt with an alkali-metal (where any remaining X is an alkali-metal). For example, if the ester is actually prepared by reacting an amino alcohol with one of the above acids, equivalent amounts (based on the acid groups) of alcohol and acid are utilized so that no carboxyl or sulfonic group, as such, remains in the resulting full ester. If less than equivalent amounts of alcohol are utilized, so that one or more carboxyl or sulfonic groups remain, these groups, for this embodiment of the invention, should be converted to an alkali-metal salt.

Typical bases, or esters, include aminoethyl methacrylate, N-methylaminoethyl methacrylate, N,N-dimethylaminoethyl methacrylate, N,N-dimethylaminoethyl acrylate, N,N-methylisopropylaminoethyl methacrylate, bis(N,N-dimethylaminoethyl) maleate, bis(N,N-dimethylaminoethyl) fumarate, bis(N,N - dimethylaminoethyl) itaconate, N,N - dimethylaminoethyl - α - sulfoacrylate-sodium salt, bis(N,N-diethylaminoethyl) citraconate, bis(N,N - dimethylaminoethyl) mesaconate, bis(N,N-methylethylaminoethyl) glutaconate, bis(N,N-dimethylaminoethyl)-α-sulfomaleate-potassium salt, N-phenyl, N-methylaminoethyl methacrylate; N-tolyl, N-ethylaminoethyl methacrylate; N-benzyl, N-methylaminoethyl acrylate; N-methyl, N-ethylbenzylaminoethyl methacrylate, N,N-dimethylaminoethyl maleate, sodium salt; N,N-diethylaminoethyl p-styrenesulfonate; N,N-dimethylaminoethyl ethylenesulfonate;

$(CH_3)_2NCH_2CH_2O_3SCH_2CH_2OOCCH=CH_2$

β-sulfoethylacrylate, N,N-dimethylaminoethyl ester;

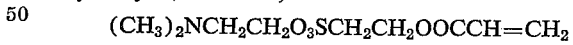

N-methacryloyl taurine, N',N'-dimethylaminoethyl ester;

$(CH_3)_2NCH_2CH_2O_3SCH_2CH_2HNCH_2CH=CH_2$

N-allyl taurine, N',N'-dimethylaminoethyl ester, and the like.

The manner in which the above acidic and basic compounds react with the fibrous substrate to increase the moisture regain is not fully understood. When a substrate comprising wool fibers is treated with these reagents, either separately or simultaneously and in the presence of one of the catalyst systems to be described hereinafter, it is not known whether the two reagents first react with one another and then with the wool fibers, or whether one or the other reagents initially reacts with the wool fiber to provide a reaction site on the fiber or just what actually happens. It is known, however, that when an acidic and a basic compound of the above described types are reacted with a fibrous substrate that a reaction occurs and that the reaction product cannot be extracted under normal conditions from the fibers with a solvent for the reaction product. Consequently, it is believed that at least a major proportion and, in most instances substantially all, of the reaction product formed is chemically attached, i.e., grafted, to the keratin fibers, most likely in polymeric form.

PARTIAL ESTERS

In another embodiment of this invention, it has been found that certain compounds by themselves, corresponding to the above basic compounds but containing both an acidic and a basic grouping will provide the desired increase in moisture regain when reacted with a keratin fiber. Included within this class of compounds are partial esters having the formulae corresponding to the formula of a partial ester which could be formed from an amino alcohol as in Formula IX, and any acid compound containing at least two acid groupings, at least one of which is —COOH. Suitable acids of this type include those set forth in Formulae II and III above, as well as an acid of the formula:

$$\text{X} \qquad \underset{\underset{R^{12}}{|}}{CH_2=C-COOH}$$

wherein $R^{12}$ is —$CH_2COOH$ or —$SO_3H$. Partial esters are provided when at least one acid grouping, either —COOH or —$SO_3H$, remains in the resulting ester.

Examples of these partial esters include the partial esters formed from a dicarboxylic ethylenically unsaturated acid, such as maleic or itaconic acid, with only 1 mole of an amino alcohol, such as N,N-dimethylaminoethanol, to form a half-maleate or half-itaconate, wherein one of the carboxyl groups remains in the resulting ester.

Similar type partial esters may be formed from sulfocarboxylic vinyl-group containing acids, such as α-sulfoacrylic acid, with only 1 mole of the amino alcohol to form the half-ester N,N-dimethylamino-ethyl-α-sulfoacrylate, wherein the —$SO_3H$ remains in the resulting ester.

Other partial esters include: mono-N,N-dimethylaminoethyl itaconate; mono-N,N-diethylaminoethyl sulfoacrylate; mono-N,N-dimethylaminoethyl maleate; bis-N,N-diethylaminoethyl) sulfomaleate; mono - N,N - dimethylaminoethyl citraconate; mono - N,N - diethylaminoethyl glutaconate; bis-(N,N-dimethylaminoethyl)aconitate.

QUATERNARY SALTS

In yet another embodiment of this invention, it has been found that certain quaternary salts also provide an increase in moisture regain. Suitable quaternary salts have formulae corresponding to that of the above full esters or partial esters, e.g., $$\text{XI} \qquad \begin{array}{c} R^{13} \quad X^- \\ R^{14}\!\!-\!\!\overset{+}{N}\!\!-\!\!A\!\!-\!\!M \\ R^{15} \end{array}$$

wherein $R^{13}$, $R^{14}$ and $R^{15}$, are selected from hydrogen, aryl, alkyl, aralkyl and alkaryl, the aryl radicals preferably containing no more than one benzene ring, the alkyl radicals preferably containing 1 to 8 carbon atoms, preferably 1 or 2; A is as defined above and wherein the sum of the carbon atoms in the groups $R^{13}$, $R^{14}$, $R^{15}$ and A, divided by the number of ammonium nitrogen atoms, is no more than about 14; $X^-$ is an anion; and M is a radical having one of the formulae XII to XV.

$$\text{XII} \qquad \underset{\underset{R^{16}}{|}}{-OOC=CH_2}$$

wherein $R^{16}$ is hydrogen, lower alkyl, —$CH_2COOY'$ wherein Y' is alkali metal or lower alkyl of 1 to 4 carbon atoms, or —$SO_3Y$ wherein Y is alkali-metal or lower alkyl of 1 to 4 carbon atoms (preferably methyl or ethyl) or $$\begin{array}{c} X^- \quad R^{13} \\ -A\!\!-\!\!\overset{+}{N}\!\!-\!\!R^{14} \\ R^{15} \end{array}$$

wherein A, $X^-$, $R^{13}$, $R^{14}$ and $R^{15}$ are as defined above.

$$\text{XIII} \qquad \underset{\underset{R^{18}}{|}}{-OOC-\overset{\overset{R^{17}}{|}}{C}=C-COOY'}$$

wherein $R^{17}$ and $R^{18}$ are selected from hydrogen, lower alkyl of 1 to 4 carbon atoms, preferably methyl or ethyl, and —$SO_3Y$; and wherein Y and Y' are as defined above.

$$\text{XIV} \qquad \underset{\underset{R^{20}}{|}}{-OOCCH_2\overset{\overset{R^{19}}{|}}{C}-C-COOY'}$$

wherein no more than one of the radicals $R^{19}$ and $R^{20}$ is COOY', the remaining radical (or radicals where neither $R^{19}$ nor $R^{20}$ is —COOY') being hydrogen, lower alkyl of 1 to 4 carbon atoms (preferably methyl or ethyl); and wherein Y' is as defined above.

$$\text{XV} \qquad \underset{\underset{R^{20}}{|}}{-OOC-\overset{\overset{R^{19}}{|}}{C}=CCH_2COOY'}$$

wherein $R^{19}$, $R^{20}$ and Y' are as defined above.

Suitable quaternary salts within this class of compounds include: (acryloyloxyethyl) trimethylammonium chloride, (methacryloyloxyethyl) - ethyldimethylammonium acrylate, $$(CH_3)_3\overset{+}{N}CH_2CH_2OOCC(=CH_2)CH_2COOC_2H_5 \cdot CH_2=CHCOO^-$$

(acryloyloxyethyl) trimethylammonium p - styrenesulfonate, $$(CH_3)_3\overset{+}{N}CH_2CH_2OOCCH=CHCOOCH_2CH_2\overset{+}{N}(CH_3)_3 \cdot 2Cl^-$$

and others derived from the above compounds.

The anion, $X^-$, may be a mineral or organic acid anion. Preferred monovalent anions include $HSO_4^-$, $H_2PO_4^-$, and the like, as well as $CH_3COO^-$, $PhCOO^-$, $$Me(CH_2)_2COO—$$

$PhCH=CHCOO^-$ and the like. Suitable divalent anions include —$SO_4^=$ [in the above formulae these will be expressed as ½($SO_4^=$)], —$HPO_4^=$, while —$PO_4^=$, citrate and the like are suitable trivalent anions. Furthermore, anions derived from any of the acids derived in Formulae I–VIII are also suitable. Particularly preferred anions include:

$$Cl^-, \; HSO_4^-, \; CH_2=CHCOO^-, \; CH_2=C(CH_3)COO^-$$
$$p\text{-}CH_2=CHC_6H_4SO_3^-$$
$$½\begin{bmatrix} CH_2=CHCCOO^- \\ SO_3^- \end{bmatrix} \; ½\begin{bmatrix} CH=\!\!=\!\!CH \\ | \quad\quad | \\ COO^- \; COO^- \end{bmatrix}$$

These quaternary compounds may be prepared by conventional quaternization procedures, e.g., by reaction of the corresponding acrylate with an alkyl halide or alkyl sulfate. For example, $$\begin{array}{c} CH_3 \\ \diagdown \\ NCH_2CH_2OOCCH=CH_2 + RX \\ \diagup \\ CH_3 \end{array}$$

$$\begin{array}{c} CH_3 \quad X^- \\ \diagdown \\ CH_3\text{-}\overset{+}{N}CH_2CH_2OOCCH=CH_2 \\ \diagup \\ R \end{array}$$

A quaternary salt molecule containing a negatively charged anion

In yet another embodiment of this invention it has been found that quaternary salts can be prepared so that the anion component is reacted with and therefore chemically attached to the quaternary salt molecule by means of a covalent bond. Among these compounds there are included quaternary salts having the formula:

XVI
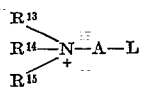

wherein $R^{13}$, $R^{14}$ and $R^{15}$ and A are as defined above with the same limitation as to number of permissible carbon atoms and wherein L has one of the following formulae: XVII, XVIII, XIX or XX.

XVII
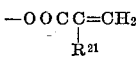

wherein $R^{21}$ is $-CH_2COO^-$ or $-SO_3^-$

Suitable quaternary compounds useful in this invention include:

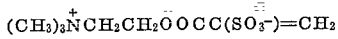

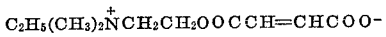

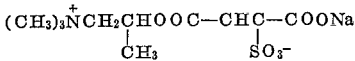

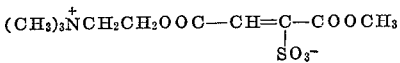

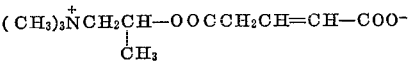

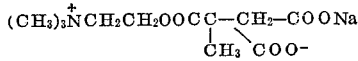

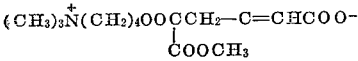

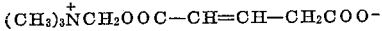

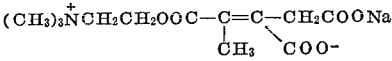

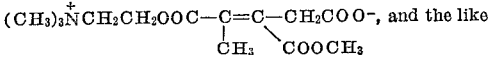

In addition to the above, the ammonium nitrogen may have substituted for the various alkyl groups shown aryl radicals, such as phenyl; aralkyl radicals, such as benzyl, and the like; or alkaryl radicals, such as tolyl, p-ethylbenzyl and the like. One such group may be combined with two methyl groups, for example, or vice versa. Any other combination of alkyl with the other type radicals is also suitable, as is the substitution of the ammonium nitrogen (or each ammonium nitrogen where more than one is present) with one of the aryl, aralkyl or alkaryl radicals along with alkyl radicals, provided, of course, that the number of carbon atoms in the substituent radicals of each ammonium nitrogen, combined with the A groupings, does not exceed 14.

These quaternary compounds may also be produced by conventional techniques, e.g., by reacting the desired amino alcohol and the desired acid to form the corresponding ester and then conducting a standard quaternization process such as shown above. For example,

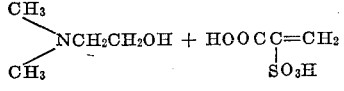

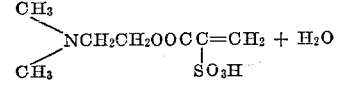

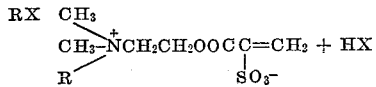

The above compounds are preferably reacted with keratin fibers by graft polymerization techniques.

A graft polymerization technique is generallly distinguished from conventional polymerization in situ procedures by covalent bonding of the polymer to the substrate involved. For example, a polymeric material grafted onto a fibrous substrate would be covalently bonded to the substrate so as to be non-extractable by a solvent for the polymer formed, whereas a simple coating or impregnation of the substrate, would be extractible to a much greater extent than the grafted polymer. The improved properties obtained by reacting fibers with the various ethylenically unsaturated compounds disclosed herein, however, are obtained regardless of whether the reacted compounds are extractible or not. Consequently, the compounds disclosed herein may be ionically bonded to the fibers, if desired, so as to be extractible therefrom.

In graft polymerization techniques, that amount of polymer which can be extracted is designated as homopolymer, while the polymer which is covalently bonded to the substrate and, therefore, is not extractible, is designated as graft polymer. It is realized, however, that some homopolymer may be occluded within the interstices of the fibers of the substrate treated and that not all of the polymeric material remaining on the substrate is graft polymer. For purposes of this invention, then, since both the occluded and graft polymer affect the moisture regain of the fibrous substrate and particularly since neither type polymer can be extracted from the substrate, the term "non-extractible polymer" will be utilized herein to define that polymeric material remaining on the fibrous substrate after polymerization occurs under graft polymerization conditions and after the treated substrate is washed with a solvent for the particular homopolymer involved until no more homopolymer is removed.

Graft polymerization techniques are usually conducted in the presence of a redox catalyst system or some other catalyst which will initiate the polymerization of vinyl type monomers. The preferred redox catalyst system includes a reducing agent and an oxidizing agent, the interaction of which provides free radicals which cause polymerization of the monomeric material onto the keratin substrate.

The reducing agent may be an iron salt, such as ferrous sulfate, acetate, phosphate; ethylenediaminetetraacetate; metallic formaldehyde sulfoxylates, such as zinc formaldehyde sulfoxylate; the alkali-metal sulfoxylates; such as sodium and potassium formaldehyde sulfoxylate; alkalimetal sulfites, such as sodium and potassium bisulfite, sulfite, metabisulfite or hydrosulfite; mercaptan acids, such as thioglycollic acid and its water-soluble salts, such as sodium, potassium or ammonium thioglycollate; mercaptans, such as hydrogen sulfide and sodium or potassium hydrosulfide; alkyl mercaptans, such as butyl or ethyl mercaptans; mercaptan glycols, such as beta-mercaptoethanol; alkanolamine sulfites, such as ethanolamine sulfite and isopropanolamine sulfite; manganous and chromous salts; ammonium bisulfite, sodium hydrosulfide, cysteine hydrochloride, sodium thiosulfate, sulfur dioxide, sulfurous acid and the like, as well as mixtures of these reducing agents. In addition, a salt of hydrazine may be used as the reducing agent, the acid moiety of the salt being derived from any acid, such as hydrochloric, hydrobromic, sulfuric, sulfurous, phosphoric, benzoic, acetic and the like.

Suitable oxidizing agents for use in the redox catalyst system include inorganic peroxides, e.g., hydrogen peroxide, barium peroxide, magnesium peroxide, etc., and the various organic peroxy catalysts, illustrative examples of which are the dialkyl peroxides, e.g., diethyl peroxide, dipropyl peroxide, dilauryl peroxide, dioleyl peroxide, distearyl peroxide, di-(tert.-butyl)peroxide and di-(tert.-amyl)peroxide, such peroxides often being designated as ethyl, propyl, lauryl, oleyl, stearyl, tert.-butyl and tert.-amyl peroxides; the alkyl hydrogen peroxides, e.g., tert.- butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic peracids, e.g., ammonium persulfate, sodium persulfate, potassium persulfate, sodium percarbonate, potassium percarbonate, sodium perborate, potassium perborate, sodium perphosphate, potassium perphosphate, and the like.

Other examples of organic peroxide initiators that can be employed are the following: tetralin hydroperoxide, tert.-butyl diperphthalate, cumene hydroperoxide, tert.-butyl perbenzoate, 2,4-dichlorobenzoyl peroxide, urea peroxide, caprylyl peroxide, p-chlorobenzoyl peroxide, 2,2-bis(tert.-butyl peroxy)butane, hydroxyheptyl peroxide, diperoxide of benzaldehyde.

The above oxidizing agents, particularly the salts of inorganic peracids, may be utilized alone to initiate the graft polymerization process, although faster reactions at lower temperatures may be conducted when the oxidizing agent is combined with a reducing agent to form a redox catalyst system. Also, ferric salts can be used as oxidizing agents and form a redox catalyst system with hydrogen peroxide, in which case the peroxide functions as a reducing agent.

Other suitable catalysts or initiators for the polymerization process include azo catalysts, such as azobisisobutyronitrile, as well as irradiation under the influence of high energy fields, including the various, diverse radiations such as ultra-violet, X-ray and gamma radiations, as well as radiation from radioactive materials, such as cobalt-60. This latter type initiating system may be used to react the above ethylenically unsaturated compounds with synthetic fibers, such as those set forth below.

In conducting the graft polymerization process, either or both of the reducing agent and oxidizing agent may be applied to the fibrous substrate prior to the application to the substrate of the monomeric material or the monomer may be applied to the substrate before either or both of the catalyst components or all components may be applied simultaneously in accordance with the teachings of the copending and coassigned U.S. patent application, Ser. No. 242,611, now Patent No. 3,457,028.

The graft polymerization of the above monomers or their derivatives may be conducted at room temperature, although temperatures between 40 and 60° C. are generally preferred. A temperature in excess of about 100° C. is not preferred since undue degradation of the preferred catalyst system, the redox system, occurs at this elevated temperature. In general, such conditions as concentrations of the reagents, pH, time and temperature of reaction may be modified to suit the individual circumstances, while still providing the desired degree of graft polymerization.

The fibrous substrate may be exposed to the monomer in vapor or liquid form, including both solutions and emulsions. Exposure to the vapors of the monomers is conveniently carried out by entraining the vapor in an oxygen free gas such as carbon dioxide or nitrogen, and then interposing the substrate in a stream of the gas and vapor. Inert volatile liquids such as water or an alcohol may be mixed with the compound being vaporized. Similarly, the fibrous substrate may be immersed in a liquid system, either solution or emulsion type, containing the desired amount of monomer.

Graft polymerization most readily takes place in the presence of water. This generally presents no problem since the catalyst components or monomers are preferably applied to the substrate in an aqueous medium. If the substrate is dried, however, prior to exposure to the monomer, polymerization will be slower. Consequently, it is preferred that the substrate be wet with water when the polymerization takes place. Ionic or non-ionic surface active agents may be utilized in any aqueous medium used in applying any of the reagents.

While the process of this invention is particularly adapted to fibrous substrates composed essentially of keratin fibers, particularly those composed entirely of wool fibers, it is also applicable to substrates containing synthetic fibers, other natural fibers and blends thereof with keratin fibers as well as to blends with other keratin fibers such as mohair, alpaca, cashmere, vicuna, guanaco, camel's hair, silk, llama and the like. The preferred synthetic fibers include polyamides such as polyhexamethylene adipamide, polyesters such as polyethylene terephthalate, and acrylic fibers such as acrylonitrile, homopolymers or copolymers of acrylonitrile containing at least about 85% combined acrylonitrile, such as acrylonitrile-methyl acrylate (85/15) and cellulosics, such as cellulose acetate, viscose rayon, paper and the like. Of the natural fibers which may be blended with the keratin fibers, cotton is preferred. When treating cellulosic substrates, ceric ion initiating systems may be utilized, e.g., in the form of ceric salts, such as ceric nitrate, ceric sulfate, ceric ammonium nitrate, ceric ammonium sulfate, ceric ammonium pyrophosphate, ceric iodate and the like.

Improved results are obtained when the keratin or cellulosic fibers are in a swollen condition during reaction. This condition is most readily obtained by conducting the reaction in the presence of a swelling agent such as urea; thiourea; lithium salts, such as the chloride, bromide and the iodide; guanadine compounds, such as the hydrochlorides; amides, such as formamide, N,N'-dimethylformamide, acetamide, N,N'-dimethylacetamide; alkali-metal hydroxides, such as sodium and potassium hydroxides and the like.

The following examples illustrate preferred embodiments of this invention.

EXAMPLE I

A swatch of wool fabric, size 12 inches x 8 inches, having a weight of 14.16 gms. at 22.2° C. and 65% relative humidity, is impregnated at room temperature for 2 hours with 200 milliliters of a 0.2% solution of ferrous ammonium sulfate containing 0.03% by weight of the surface-active agent Surfonic N-95. The swatch is then removed, blotted to a total weight of 21 gms. and air dried to a total weight of 14.5 gms. in 1½ hours at room temperature.

A solution in 450 milliliters of water of 7.85 gms. of N,N-dimethylaminoethyl methacrylate (containing 0.2% by weight of the polymerization inhibitor p-methoxyphenol) and 4.3 gms. of glacial methacrylic acid (containing 0.025% by weight of p-methoxyphenol) is adjusted to a pH of 5.5 with sulfuric acid and introduced into a closeable container. After flushing this solution with nitrogen for 10 minutes at 50° C., a solution of 0.1 milliliter of 35% hydrogen peroxide in 5 milliliters of water is added with mixing and the above swatch of impregnated wool introduced. The container is then tightly closed and the contents kept at 50° C. with occasional agitation for 5.5 hours. On completion, the wool fabric is removed, washed thoroughly with water and Surfonic N-95 at 50° C. and treated with ethylenediamine tetraacetic acid at a pH of 2 to remove any residual iron which may be present. After conditioning at 22.2° C. in 65% relative humidity, the fabric weighs 22.56 gms.

With shorter reaction times, the increase in weight is not as great as that recorded above; details are given in the table below showing the relationship between reaction time, weight increase, moisture regain and area felting shrinkage of the product. The moisture regain of the untreated and treated wool is determined by drying the material to constant weight in an oven at 105° C. The treated wool differs from the original wool further in that it possesses a fuller hand.

| Reaction time, hours | Increase in weight (percent) | Moisture regain (percent) | Area felting shrinkage (percent) |
|---|---|---|---|
| 0 | 0 | 16.0 | 47 |
| 1.0 | 14 | 18.9 | 39 |
| 2.0 | 28 | 20.9 | 37 |
| 4.5 | 43 | 22.3 | 23 |
| 5.5 | 59 | 25.1 | 2 |

EXAMPLE II

A swatch of wool fabric, 13.09 gms., is impregnated with ferrous iron and treated with a solution of 9.3 gms. N,N-diethylaminoethyl methacrylate, 3.6 gms. glacial acrylic acid containing 0.02% p-methoxyphenol and 0.25 milliliters of 50% hydrogen peroxide in water at pH 5.5 for 5 hours at 50° C., as described in Example I. After washing and conditioning, the wool is found to weigh 19.79 gms., the increase in weight thus being 51%. The moisture regain is 20.6% compared with 16.5% for a similar swatch of untreated wool. The area felting shrinkage of the treated wool is 40% compared with 54% for the untreated wool.

EXAMPLE III

A swatch of wool fabric, 13.29 gms., is impregnated with ferrous iron and treated with a solution of 3.25 gms. itaconic acid, 9.3 gms. N,N-dimethylaminoethyl methacrylate, and 0.25 milliliter of 50% hydrogen peroxide in water at pH 5.5 for 5 hours at 20° C. as described in Example I. At the end of the reaction, the solution is found to have a pH of 5.4. After washing and conditioning, the fabric weighs 17.49 gms., the increase in weight being 32%. The moisture regain and area shrinkage of the treated wool are 20.6% and 50%, respectively, the corresponding values for untreated wool being 16.5% and 54%.

EXAMPLE IV

A swatch of wool fabric, 13.86 gms., is impregnated with ferrous iron and then treated with a solution of 4.6 gms. styrene-p-sulfonic acid, 4.4 gms. N,N-dimethylaminoethyl methacrylate and 0.25 milliliter of 50% hydrogen peroxide in water at 50° C. for 5 hours as described in Example I. The initial pH of this solution is 5.6 and during the course of the reaction this falls to 5.1. After washing and conditioning as before, the treated wool weighs 22.67 gms., the increase in weight being 64%. The moisture regain of the treated wool is 20.0% and the area felting shrinkage 30%. Corresponding values for untreated wool are 16.75% and 54%, respectively. When compared with the original wool fabric, the treated fabric is found to have a greater affinity for basic dyestuffs, such as Sevron Brilliant Red 4G, and a reduced affinity for acidic dyestuffs, such as Sulphon Acid Blue RA.

EXAMPLE V

A swatch of wool fabric, 14.61 gms., is impregnated with ferrous ammonium sulfate and treated with a solution of 4.2 gms. α-sulfoacrylic acid, 6.9 gms. N,N-dimethylaminoethyl methacrylate and 0.25 milliliter of 50% hydrogen peroxide at 50° C. for 5 hours as described in Example I. The initial pH of 5.5 falls to 5.3 during the course of the reaction. After washing and conditioning, the treated wool shows a weight increase of 37% with a moisture regain of 20.3% and an area felting shrinkage of 40%. The original untreated wool had a moisture regain of 16.6% and an area felting shrinkage of 54%. The treated wool exhibits dyeing characteristics similar to those possessed by the product of Example IV.

EXAMPLE VI

The procedures of Example V are repeated except that N,N-dimethylaminoethyl acrylate is substituted for N,N-dimethylaminoethyl methacrylate. A similar improvement in moisture regain and alteration in dyeing characteristics is obtained.

EXAMPLE VII

Following the procedure of Example V the partial ester, mono-N,N-diethylaminoethyl sulfoacrylate, the quaternary salts (acryloyloxyethyl) triethylammonium chloride and

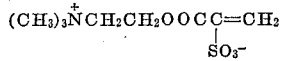

are reacted with a wool fabric. Particularly enhanced moisture regain is obtained with the quaternary salts while the wool fabric reacted with the partial ester also exhibits an increased affinity toward basic dyestuffs.

That which is claimed is:

1. A method of modifying the characteristics of keratin fibers comprising reacting said fibers with
   (a) a partial ester obtained by reacting
      (1) an amino alcohol of the formula:

wherein $R^8$ and $R^9$ are selected from hydrogen, aryl, alkyl, aralkyl and alkaryl; and wherein A is $(CR^{10}R^{11})_n$ wherein $R^{10}$ and $R^{11}$ are selected from hydrogen, methyl and ethyl and $n$ has a numerical value of 2 to 4; and wherein the total number of carbon atoms in said alcohol is no more than about 12, and
      (2) at least one acid having the formula:

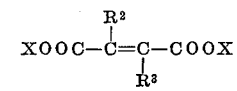

wherein $R^2$ and $R^3$ are selected from hydrogen, lower alkyl, and —SO$_3$X;

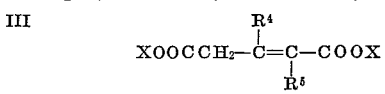

wherein no more than one of the radicals $R^4$ and $R^5$ comprises —COOX, the remaining radicals being selected from hydrogen and lower alkyl; at least one X in each of said acids of Formulae II and III being hydrogen, the remaining X being selected from hydrogen, lower alkyl and an alkali-metal ion;

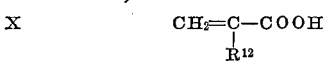

wherein $R^{12}$ selected from —CH$_2$COOH and —SO$_3$H; at least one —COOH or —SO$_3$H group remaining in said partial ester, or
   (b) a quaternary compound of the formula:

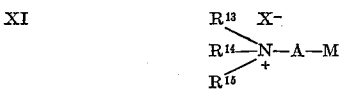

wherein $R^{13}$, $R^{14}$ and $R^{15}$ are selected from hydrogen, aryl, alkyl, aralkyl and alkaryl; A is $(CR^{10}R^{11})_x$ wherein $R^{10}$ and $R^{11}$ are selected from hydrogen, methyl or ethyl and $x$ has a numerical value of 2 to 4; and wherein the sum of the carbon atoms in the groups $R^{13}$, $R^{14}$ and $R^{15}$ and A divided by the number of ammonium nitrogen atoms is no more than about 14; $X^-$ is an anion; and M is a radical having one of the following formulae:

XII

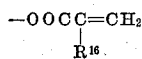

wherein $R^{16}$ is selected from hydrogen, lower alkyl, —$CH_2COOY'$ and —$SO_3Y$ wherein $Y'$ is alkali metal or lower alkyl of from 1–4 carbons atoms and wherein Y is selected from alkali-metal, lower alkyl and

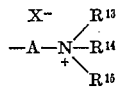

wherein $R^{13}$, $R^{14}$, $R^{15}$, $X^-$ and A have the meaning given above;

XIII

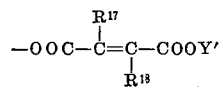

wherein $R^{17}$ and $R^{18}$ are selected from hydrogen, lower alkyl and —$SO_3Y$ wherein Y and $Y'$ have the meaning given above;

XIV

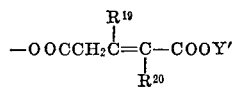

wherein no more than one of the radicals $R^{19}$ and $R^{20}$ is —$COOY'$, the remaining radical(s) being selected from hydrogen and lower alkyl and wherein $Y'$ has the meaning given above;

XV

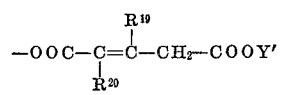

wherein $Y'$, $R^{19}$ and $R^{20}$ have the meaning given above in the presence of a chemical catalyst at a temperature and for a time sufficient to effect the desired graft polymerization.

2. A method of modifying the characteristics of keratin fibers comprising reacting with said fibers a partial ester corresponding to that obtained by reacting (1) an amino alcohol as set forth in Formula IX of claim 1 and (2) at least one acid selected from the acids as set forth in Formulae II and III of claim 1 and an acid of the formula:

X $\quad CH_2=C-COOH$
$\quad\quad\quad\quad\quad |$
$\quad\quad\quad\quad\quad R^{12}$ wherein $R^{12}$ is selected from —$CH_2COOH$ and —$SO_3H$; at least one —COOH or —$SO_3H$ group remaining in said partial ester; in the presence of a chemical catalyst at a temperature and for a time sufficient to effect the desired graft polymerization.

3. The method of claim 2 wherein the reaction is conducted in the presence of a redox catalyst system.

4. The method of claim 2 wherein the partial ester comprises mono-N,N-diethylaminoethyl alpha-sulfoacrylate.

5. A method of modifying the characteristics of keratin fibers comprising reacting said fibers with a quaternary compound of the formula:

XI

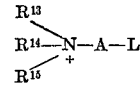

wherein $R^{13}$, $R^{14}$ and $R^{15}$ are selected from hydrogen, aryl, alkyl, aralkyl and alkaryl; A is $(CR^{10}R^{11})_x$ wherein $R^{10}$ and $R^{11}$ are selected from hydrogen, methyl or ethyl and x has a numerical value of 2 to 24; and wherein the sum of the carbon atoms in the groups $R^{13}$, $R^{14}$ and $R^{15}$ and A divided by the number of ammonium nitrogen atoms is no more than about 14; $X^-$ is an anion; and M is a radical having one of the following formulae:

XII

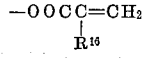

wherein $R^{16}$ is selected from hydrogen, lower alkyl, —$CH_2COOY'$ and —$SO_3Y$, wherein $Y'$ is alkali metal or lower alkyl of from 1 to 4 carbon atoms and wherein Y is selected from alkali-metal, lower alkyl and

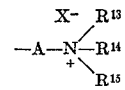

wherein $R^{13}$, $R^{14}$, $R^{15}$, $X^-$ and A have the meaning given above;

XIII

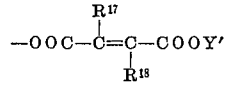

wherein $R^{17}$ and $R^{18}$ are selected from hydrogen, lower alkyl and —$SO_3Y$ wherein Y and $Y'$ have the meaning given above;

XIV

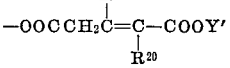

wherein no more than one of the radicals $R^{19}$ and $R^{20}$ is —$COOY'$, the remaining radical(s) being selected from hydrogen and lower alkyl and wherein $Y'$ has the meaning given above;

XV

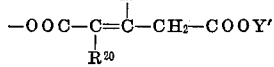

wherein $Y'$, $R^{19}$ and $R^{20}$ have the meaning given above in the presence of a chemical catalyst at a temperature and for a period of time sufficient to effect the desired graft polymerization.

6. The method of claim 5 wherein the reaction is conducted in the presence of a redox catalyst system.

7. The method of claim 5 wherein the quaternary compound comprises (acryloyloxyethyl) triethylammonium chloride.

8. A method of modifying the characteristics of keratin fibers comprising reacting said fibers with a quaternary compound of the formula:

XVI $\quad\quad R^{13}$
$\quad\quad\quad \searrow$
$R^{14}\!\!-\!\!N\!\!-\!\!A\!\!-\!\!L$
$\quad\quad\quad \nearrow +$
$\quad\quad R^{15}$ wherein $R^{13}$, $R^{14}$ and $R^{15}$ are selected from hydrogen, aryl, alkyl, aralkyl and alkaryl; A is $(CR^{10}R^{11})_x$ wherein $R^{10}$ and $R^{11}$ are selected from hydrogen, methyl or ethyl and x has a numerical value of 2 to 4, the sum of the carbon atoms in $R^{13}$, $R^{14}$, $R^{15}$ and A divided by the number of ammonium nitrogen atoms being no more than about 14, and wherein L has the following formula:

XVII $\quad -OOCC=CH_2$
$\quad\quad\quad\quad\quad |$
$\quad\quad\quad\quad\quad R^{21}$ wherein $R^{21}$ is selected from —$CH_2COO^-$ and —$SO_3^-$; in the presence of a chemical catalyst at a temperature and for a time sufficient to effect the desired graft polymerization.

9. The method of claim 8 wherein the reaction is conducted in the presence of a redox catalyst system.

10. The method of claim 8 wherein the quaternary compound comprises
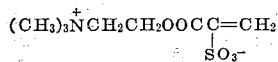
11. The product of the method of claim 1.
12. The product of the process of claim 2.
References Cited
UNITED STATES PATENTS
3,035,009  5/1962  Murdock et al. _____ 8—55 X
FOREIGN PATENTS
1,233,697  5/1960  France.
GEORGE F. LESMES, Primary Examiner
J. CANNON, Assistant Examiner
U.S. Cl. X.R.
8—15, 31, 65, 100, 115.5, 115.7, 116, 116.2